(12) United States Patent
Steinkraus (10) Patent No.: US 10,885,895 B2
(45) Date of Patent: Jan. 5, 2021

(54) SQUEAKER CAP FOR A WATER BOTTLE USED IN A DOG CRUNCHER TOY

(71) Applicant: Gramercy Products, Inc., Secaucus, NJ (US)

(72) Inventor: William Steinkraus, Fort Lee, NJ (US)

(73) Assignee: Gramercy Products, Inc., Secaucus, NJ (US)

( * ) Notice: Subject to any disclaimer, the term of this patent is extended or adjusted under 35 U.S.C. 154(b) by 0 days.

(21) Appl. No.: 16/379,914

(22) Filed: Apr. 10, 2019

(65) Prior Publication Data

US 2020/0327875 A1    Oct. 15, 2020

Related U.S. Application Data (63) Continuation-in-part of application No. 16/378,818, filed on Apr. 9, 2019, now Pat. No. 10,755,684.

(51) Int. Cl.
*A01K 15/02* (2006.01)
*G10K 3/00* (2006.01)
*B65D 41/02* (2006.01)

(52) U.S. Cl.
CPC .............. *G10K 3/00* (2013.01); *A01K 15/025* (2013.01); *A01K 15/026* (2013.01); *B65D 41/02* (2013.01); *B65D 2251/01* (2013.01)

(58) Field of Classification Search
CPC ..... A01K 15/02; A01K 15/025; A01K 15/026
(Continued)

(56) References Cited

U.S. PATENT DOCUMENTS 2,763,960 A * 9/1956 Wintriss .................. A63H 5/00
446/184
4,801,929 A 1/1989 Instance
(Continued)

FOREIGN PATENT DOCUMENTS

GB          266032       2/1927
WO      WO 96/27549    12/1996
(Continued)

OTHER PUBLICATIONS

Bamboo Fat Cat, "Water Bottle Crunchers Dog Toy," Amazon.com, 2019, available at: https://www.amazon.com/Water-Bottle-Crunchers-Dog-Assorted/dp/B001B4SG2I.
(Continued)

*Primary Examiner* — David J Parsley
(74) *Attorney, Agent, or Firm* — Thomas A. O'Rourke; Bodner & O'Rourke, LLP (57) ABSTRACT

A device mounts to a water bottle and produces sounds when the bottle is chewed by a dog, and includes a cap and squeaker. The cap includes: a body with a first opening on a first side defining an interior surface of a cavity, with a plurality of internal threads; and a second opening on a second side being in fluid communication with the cavity. A plurality of fingers are spaced about the second opening, and extend toward the first side, being at a first angle with respect to an axis of the interior surface. The squeaker is inserted into the second opening, and a protruding region of its housing causes the fingers to deform to a second angle with respect to the axis, after which the plurality of fingers nest between an end flange and the protruding region. Internal threads mount the device to threading of the water bottle.

8 Claims, 6 Drawing Sheets

(58) Field of Classification Search
USPC .......................................... 119/702, 707, 709
See application file for complete search history.

(56) References Cited

U.S. PATENT DOCUMENTS

| | | | |
|---|---|---|---|
| 5,464,092 A | 11/1995 | Seeley | |
| 6,545,594 B1 | 4/2003 | Knight | |
| 6,771,165 B2 | 8/2004 | Burg | |
| 6,831,552 B2 | 12/2004 | Lin | |
| 7,189,134 B2 | 3/2007 | Nugent | |
| 8,235,762 B2 * | 8/2012 | Rutherford | A63H 5/00 119/707 |
| 8,468,977 B2 * | 6/2013 | Markham | A01K 15/025 119/709 |
| 9,021,990 B2 * | 5/2015 | Rutherford | A01K 15/026 119/707 |
| 9,370,167 B2 * | 6/2016 | Vap | A01K 29/00 |
| 9,814,994 B1 * | 11/2017 | Woods | A63H 5/00 |
| 2009/0321474 A1 | 12/2009 | Ferrell | |

FOREIGN PATENT DOCUMENTS

| | | |
|---|---|---|
| WO | WO 01/10732 | 2/2001 |
| WO | WO 01/76968 | 10/2001 |
| WO | WO 02/49934 | 6/2002 |
| WO | WO 02/099783 | 12/2002 |

OTHER PUBLICATIONS

ZippyPaws, "ZippyPaws: Water Bottle Crusherz Dog Toy," You Tube, Oct. 26, 2014, available at: https://www.youtube.com/watch?v=hLHeSLGQKSw.

"Press Fit Engineering and Design Calculator," available at: www.engineersedge.com/calculators/machine-design/press-fit/press-fit-calculator.htm, Feb. 25, 2019.

* cited by examiner

SQUEAKER CAP FOR A WATER BOTTLE USED IN A DOG CRUNCHER TOY

CROSS REFERENCES TO RELATED APPLICATIONS

This application is a continuation in part of U.S. patent application Ser. No. 16/378,818, filed on Apr. 9, 2019, titled "Squeaker Arrangement Producing Variable Sounds," the disclosures of which are incorporated herein by reference.

FIELD OF THE INVENTION

The subject technology relates generally to dog toys, and more particularly to a squeaker cap that may be threaded onto a standard water bottle that is used in a dog's cruncher toy.

BACKGROUND OF THE INVENTION

There are numerous different toys that have been devised to help keep a dog entertained and occupied, particularly while left alone by themselves. It has been widely recognized that many dogs love chewing on and hearing the crunching sound made by thin plastic water bottles. As a result, many pet toy manufacturers have created a heavy fabric cloth holder into which the plastic bottle can be inserted, for safer chewing of the bottle by the owner's dog, as it may protect the dog's mouth from sharp edges that may be created by the deformed/torn plastic. These holders are typically adorned with dog-related embroidery and/or other designs. When a dog has crunched the bottle flat and it ceases to produce crunching sounds anymore, the animal owner may simply remove the depleted plastic water bottle, and may remove the bottle top and bottle label from a fresh/clean plastic bottle, which may then inserted within the heavy fabric cloth holder for the dog to enjoy anew. These fabric holders are sold in pet stores and are also commonly marketed within online marketplaces.

However, the crunching of the plastic water bottle to the point of being flattened and depleted may proceed at a fairly rapid rate; and a number of dogs are not as amused by the simple crunching sound that is produced.

Therefore, the apparatus disclosed herein is particularly configured to increase the entertainment provided by the crunching of the plastic water bottle and to reduce the speed at which it may be flattened by the enthusiastic dog chewing on the toy.

OBJECTS OF THE INVENTION

It is an object of the invention to provide a replacement bottle cap for a plastic water bottle that slows down the crunching and flattening of the water bottle by a dog chewing thereon.

It is another object of the invention to provide a replacement bottle cap for a plastic water bottle that includes a squeaker to further entertain a dog while the dog chews on the water bottle.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with at least one embodiment of the disclosed apparatus, a squeaker device that may be mounted onto a water bottle to produce sounds when the water bottle is chewed on by a dog may broadly include a combination cap and a squeaker.

The cap may include a body with a first opening on a first side thereof defining an interior surface of a cavity, with a plurality of internal threads formed on the interior surface; and a second opening on a second side of the body extending to the interior surface, being in fluid communication with the cavity. A plurality of deformable fingers (i.e., at least two fingers) are spaced about the second opening on the second side of the body, and formed to extend from the second side of the cap towards the first side, being at a first angle with respect to an axis of the interior surface, when the fingers are undeformed.

The squeaker includes a housing that supports a cup and a reed that vibrates as air passes over the reed. The exterior of the squeaker housing includes an end flange, a protruding region, and a neck region between the end flange and the protruding region, each of which are particularly formed. When the squeaker is inserted into the second opening at the second end of the cap, the protruding region of the squeaker housing initially contacts and causes the fingers to deform outwardly, until the neck region reaches and contacts the fingers, maintaining them at a second angle with respect to the axis of the body, such that the plurality of fingers become nested and trapped between the end flange and the protruding region. The plurality of internal threads formed on the interior surface of the body are configured to mount the cap and squeaker combination to a standard threaded water bottle.

The plurality of fingers on the squeaker housing may be equally spaced about the second opening on the second side of the body. Although only one such finger need be used, at least two fingers may instead be used to provide for symmetric loading and retention, and in one embodiment the plurality of fingers may consist of five fingers equally spaced about the second opening on the second side of the body. The first side of the body of the cap may be substantially flat; and an exterior surface of the end flange of the squeaker housing may also be substantially flat, such that it may be flush with the substantially flat first side of the body of the cap after the squeaker is inserted into the second opening. For easier installation, the protruding region of the housing may be formed to have a conical outer surface; and the neck region of the housing may also be formed to have a conical outer surface rather than simply being cylindrical. A side surface of the body of the cap may be cylindrical, and may have rulings thereon for ease of gripping and actuating of the cap.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed apparatus.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit (e.g., for a 0.1250 inch shaft diameter the opening may be 0.1285 inches for a close fit and may be 0.1360 inches for a free (running) fit; and for a 0.5000 inch diameter shaft size the opening may be 0.5156 inches for a close clearance fit and may be 0.5312 inches for a free clearance fit). Other clearance amounts may also be used.

Also, the drawings are not necessarily to scale (i.e., a part feature that measures one inch on the printed patent application document may not necessarily be one inch long), with emphasis instead being placed upon illustrating aspects of the invention; however, the drawings are created from three-dimensional computer graphics models of the parts shown therein, and therefore the relative sizes of features shown within the figures are accurately depicted.

It is further noted that any use herein of relative terms such as "top," "bottom," "upper," "lower," "vertical," and "horizontal" are merely intended to be descriptive for the reader, and may be based on the depiction of those features within the figures for one particular position of the device, and such terms are not intended to limit the orientation with which the device of the disclosed apparatus may be utilized.

Figure 15:
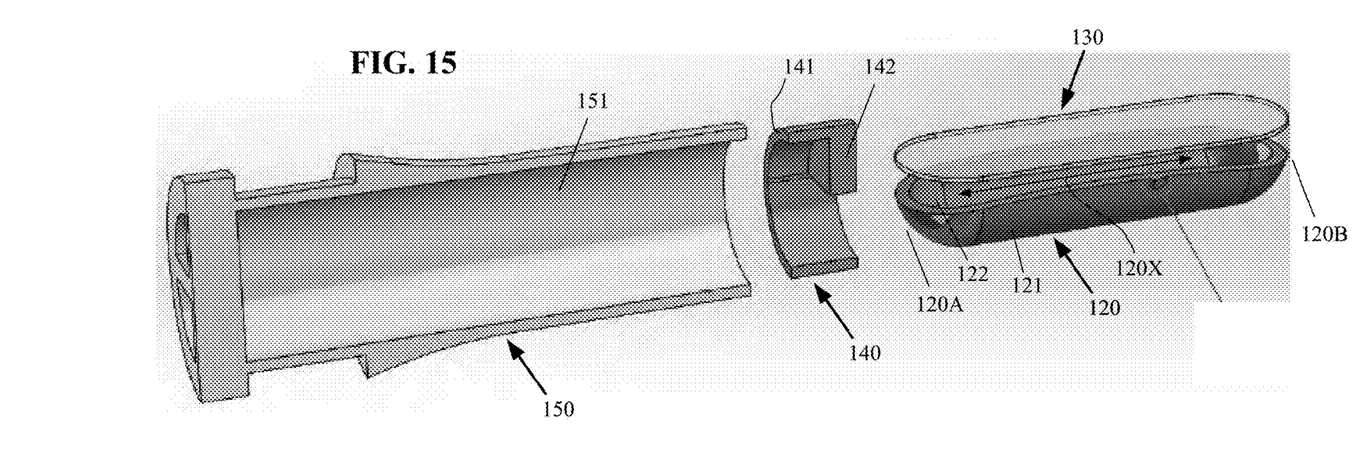
FIG. 15 is an exploded perspective view of the parts of the squeaker of the bottle cap assembly of FIG. 1.
Figure 16:
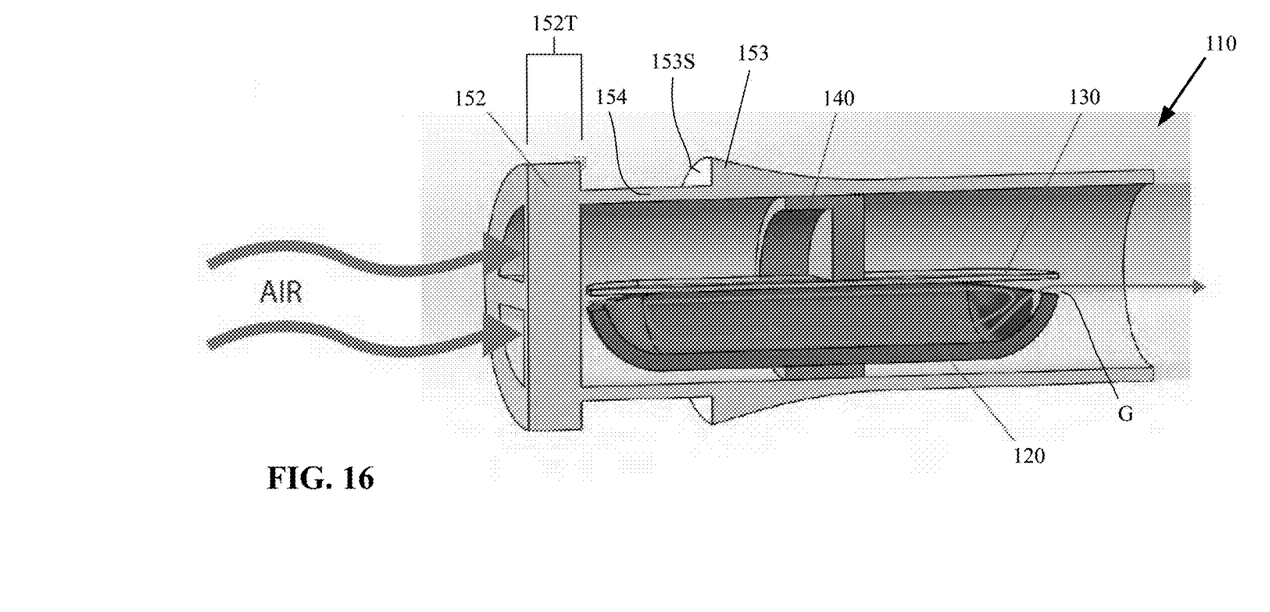
FIG. 16 shows the parts of the squeaker of FIG. 15, after being assembled.
Figure 17:
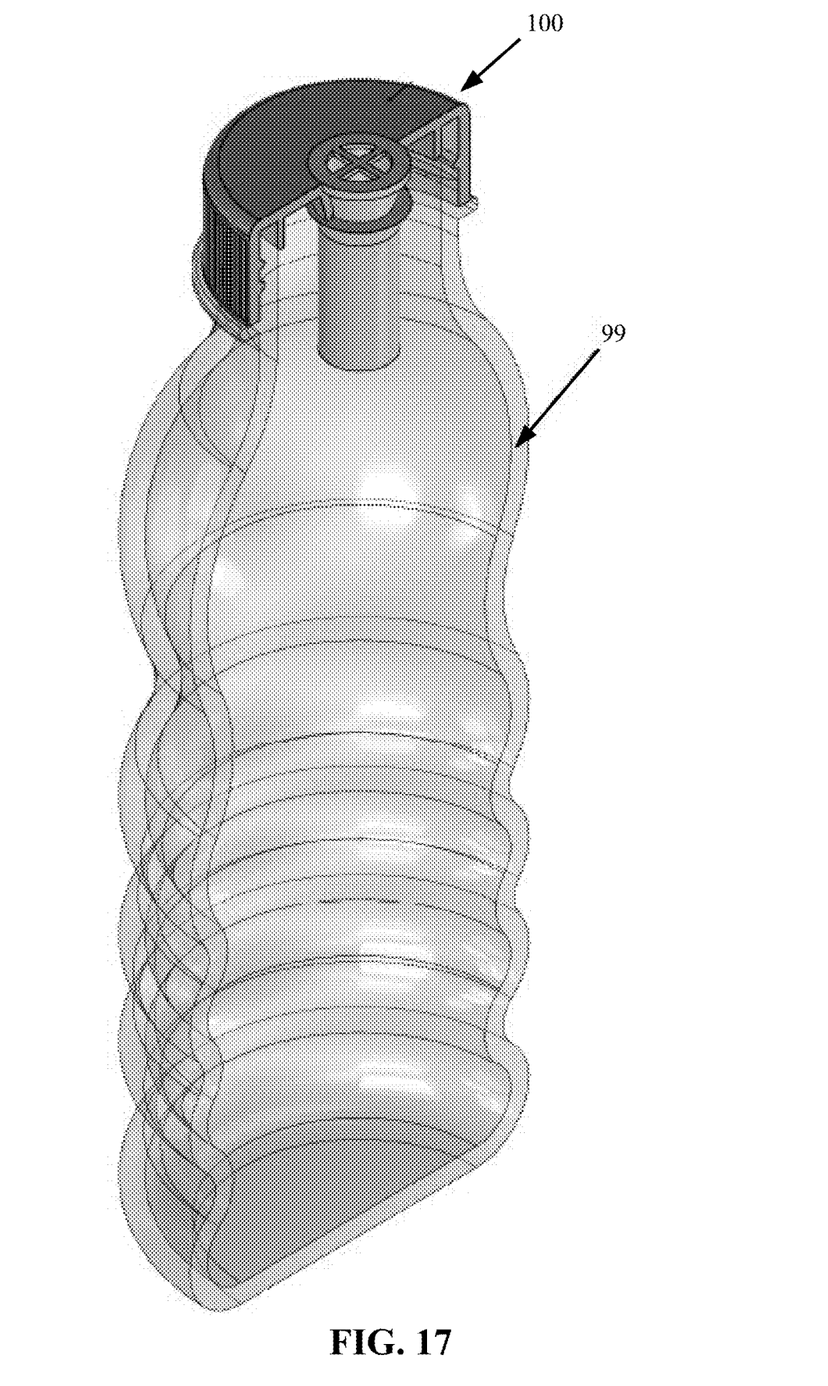
FIG. 17 is perspective view of the cap assembly of FIG. 1 after being threaded onto a standard sized plastic water bottle.
Figure 18:
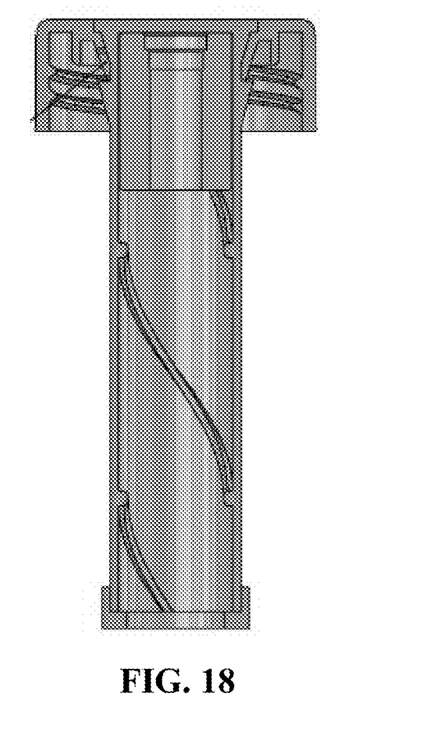
FIG. 18 is the cutaway side view of FIG. 8, but showing an alternate arrangement that may be used for supporting the squeaker.
Figure 19:
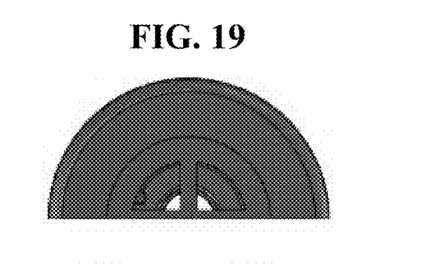
FIG. 19 is a cutaway top view of the arrangement shown in FIG. 18.
Figure 20:
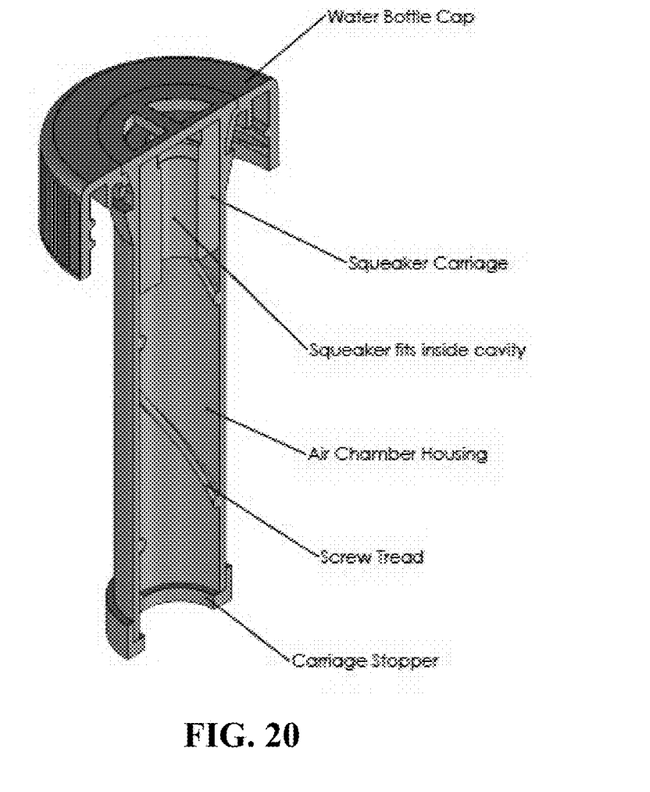
FIG. 20 is a cutaway perspective view of the arrangement shown in FIG. 18.

In accordance with at least one embodiment of the disclosed apparatus, a squeaker cap assembly 100, for mounting to a standard water bottle 99 to produce sounds when the water bottle is chewed on as a dog cruncher toy, may broadly include a squeaker device 110 and a cap 160. Perspective views of the squeaker cap assembly 100 are shown in FIGS. 1-9, while views of the cap 160 are shown in FIGS. 10-14 and views of the squeaker device 110 are shown in FIGS. 15-16. FIG. 17 illustrates the squeaker cap assembly 100 mounted to a standard plastic water bottle for use as a dog cruncher/squeaker toy.

As seen in FIG. 15, the squeaker device 110 may be made of a resonator cup 120, a reed 130, a cup and reed support member 140, and a housing 150. The resonator cup 120 may have an elongated body formed of a curved wall that may extend along an axial direction 120X from a first end 120A to a second end 120B. As seen in FIG. 15, the curved wall of the resonator cup 120 may have an outer surface 121 and an inner surface 122, which may be an offset of the outer surface, to provide for a particular wall thickness. Both the inner surface 122 and the outer surface 121 may have a semicircular cross-sectional shape at its central portion, which semicircular cross-sectional shape may transition to quarter-spherical surfaces at the ends 120A and 120B. The curved wall may terminate on a generally flat surface, and may form a race-track shaped periphery where the ends of each of the outer surface 121 and the inner surface 122 terminate on the flat surface. The resonator cup 120 may thus resemble half of a pressure vessel, which is typically formed of a cylindrical center section with ends that are each hemispherical. The resonator cup 120 may also resemble a race track oval. The flat surface of the curved wall may extend only throughout the central portion of the cup 120, as it may transition to respective angled surfaces that may angle towards the distal ends 120A and 120B of the cup, to provide for a small gap G between the ends of the resonator cup and the reed, when the reed is mounted thereto (see, FIG. 16).

The reed 130 may have a shape that corresponds to the termination of the curved wall of the resonator cup 120 (i.e., it may have a similar/same race track oval shape for its periphery), and may be positioned over the correspondingly shaped opening in the cup, with a central portion of the periphery of the reed positioned in contact with the generally flat surface of the cup. This relationship between the central portion of the periphery of the reed 130 being in contact with the generally flat surface of the resonator cup 120 may be maintained by receiving the reed and the cup within the correspondingly shaped opening in the support member 140. Note that only section views showing a portion (i.e., roughly half) of the support member 140 and the housing 150 are illustrated within FIGS. 15-16. Therefore, the support member 140 may be a short length of a ring-shaped member, having a continuous outer ring 141 and a flange 142, where the flange may have an opening that is sized to hold the reed 130 and resonator cup 120 together in a friction fit.

The reed 130 and resonator cup 120 being held together in a friction fit within the support member 140 is shown in FIG. 16. The outer surface of the outer ring 141 of support member 140 may be cylindrical, and may be sized to fit within the correspondingly shaped interior surface 151 of the housing 150, in either a clearance fit or a friction fit. Adhesive may be used to secure the outer ring 141 of the support member 140 to the squeaker housing 150, particularly where a clearance fit is used.

With the reed 130 being so positioned within the squeaker housing 150, air flowing into the housing over the first end of the reed as seen in FIG. 16, and thereafter into the plastic bottle, would cause the first end of the reed to vibrate and produce sound. Similarly, when the water bottle is squeezed, air would flow in the opposite direction than is illustrated in FIG. 16, and would cause the second end of the reed—the end being closer to the interior of the bottle—to vibrate and produce sound.

The squeaker housing 150 may have features formed on its exterior surface to facilitate securement of the squeaker device 110 to the cap 160.

The cap 160 is shown in FIGS. 10-14. As seen therein, the cap 160 may have a substantially cylindrical body formed with a radius R, and which may extend from a first side 161 to a second side 162 of the cap. A first opening on the first side 161 of the cap may define a cylindrical interior surface 163 of a cavity, which may have a plurality of internal threads 164 formed thereon. The cylindrical interior surface 163 and the plurality of internal threads 164 formed on the cylindrical interior surface are configured to mount the cap 160 to the threaded water bottle 99 (see FIG. 17). Various different sizes for the interior surface and threading formed thereon may be used to match the openings that are commonly used for plastic water bottles and other similar plastic bottles. e.g., a 38-430 size (i.e., fits a 38 mm diameter having 430 GPI threading). A second opening formed on the second side 162 of the body may define a second cylindrical interior surface 165 and a ledge 166, and which second opening may neck down beyond the ledge and extend to the interior surface, to be in fluid communication with the cavity defined by the cylindrical interior surface 163.

One or more deformable fingers (e.g., 167A, 167B, 167C, 167D, 167E, etc.) may be positioned (e.g., be equally spaced) about the ledge 166, and may be formed to extend generally towards the first side of the cap, and may be at a first angle 91 (see FIG. 8) with respect to an axis of the cylindrical interior surface, when the fingers are undeformed.

To be received by those features of the cap 160 as shown in the figures, the squeaker housing 150 (see FIG. 16) may have an end flange 152 having a thickness 152T, which thickness may be roughly the same as, or be slightly less than, the length/extent of the second cylindrical interior surface 165 of the cap. As such, where the second side 162 of the body of the cap 160 is substantially flat, the exterior surface of the end flange 152 of the housing may also be substantially flat and may be flush with the substantially flat second side 162 of the body of the cap, when the squeaker is inserted into the second opening.

The squeaker housing 150 may also have a protruding region 153 that may be conically shaped, and may terminate in a flat surface 153S that may be substantially parallel to the proximal side of the end flange 152. The distance between the flat surface 153S and the proximal side of the end flange 152 may be roughly the same as or slightly longer than the length of the fingers.

In one embodiment, each of the plurality of deformable fingers (167A, 167B, 167C, 167D, 167E, etc.) may extend perpendicularly away from the first side 161 of the cap (i.e., the fingers may extend parallel to the axis 160X of the cylindrical interior surface). In this embodiment the neck region 154 of the squeaker housing 150 may be generally cylindrical.

Figure 1:
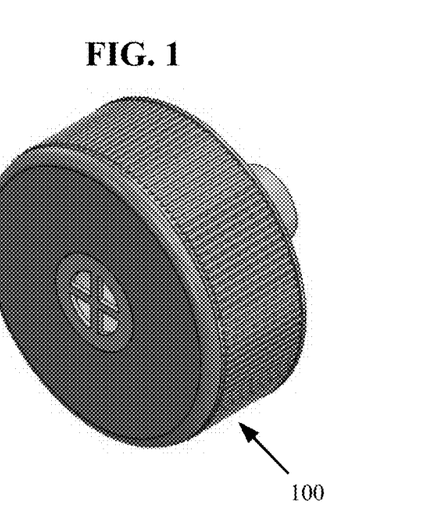
FIG. 1 is a first perspective view of the bottle cap assembly disclosed herein.
Figure 2:
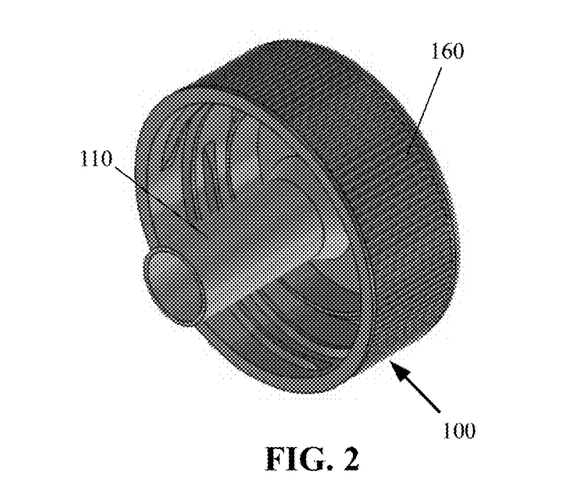
FIG. 2 is a second perspective view of the bottle cap assembly shown in FIG. 1.
Figure 3:
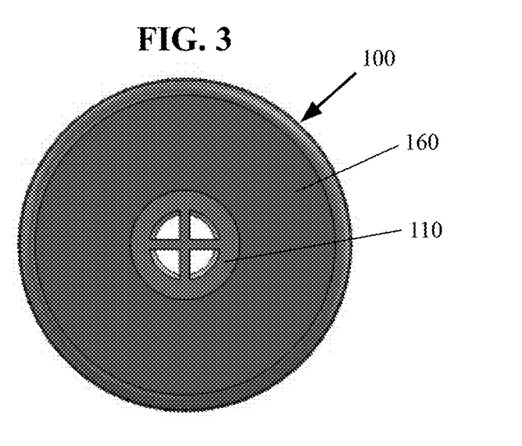
FIG. 3 is a top view of the bottle cap assembly shown in FIG. 1.
Figure 4:
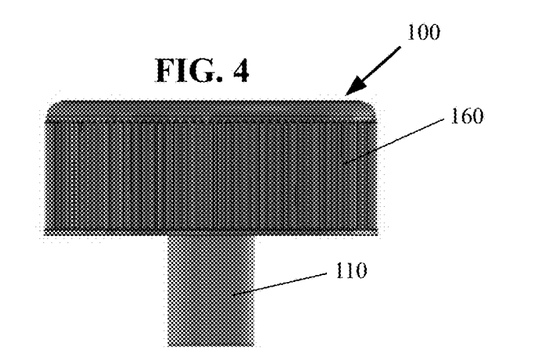
FIG. 4 is a side view of the bottle cap assembly shown in FIG. 1.
Figure 5:
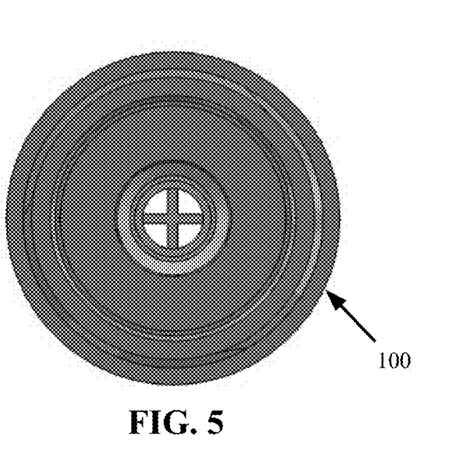
FIG. 5 is a bottom view of the bottle cap assembly shown in FIG. 1.
Figure 6:
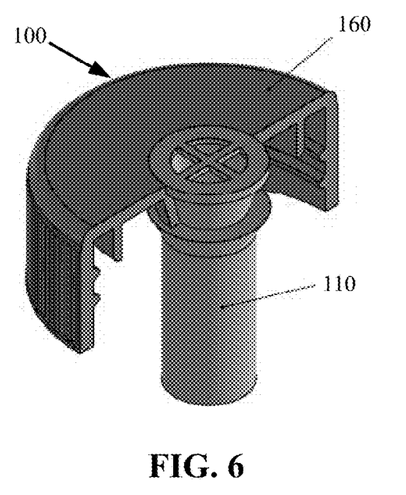
FIG. 6 is a first cut-away perspective view of the bottle cap assembly shown in FIG. 1.
Figure 7:
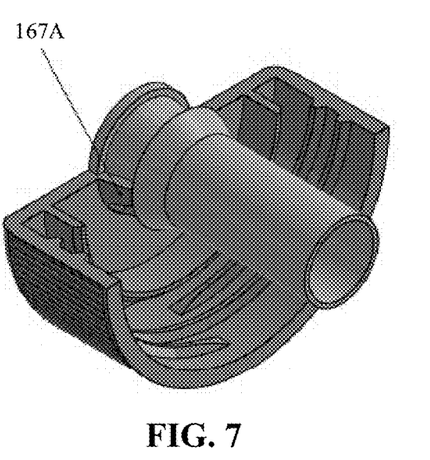
FIG. 7 is a second cut-away perspective view of the bottle cap assembly shown in FIG. 1.
Figure 8:
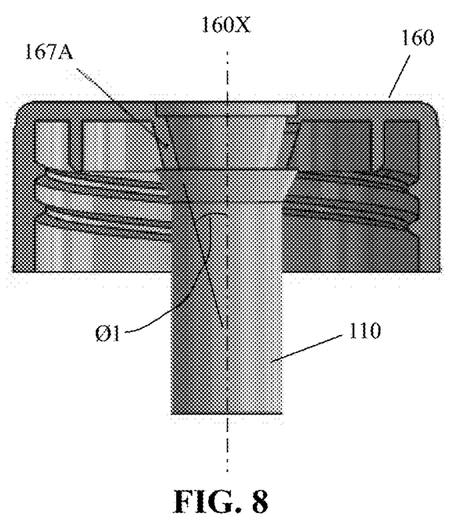
FIG. 8 is a first cut-away side view of the bottle cap assembly shown in FIG. 1.
Figure 9:
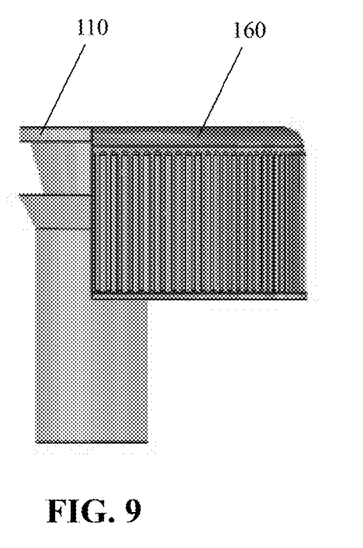
FIG. 9 is a second cut-away side view of the bottle cap assembly shown in FIG. 1.
Figure 10:
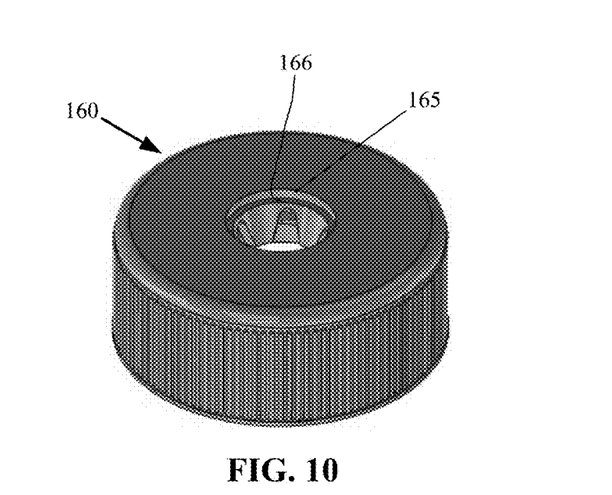
FIG. 10 is a top perspective view of the cap of the bottle cap assembly of FIG. 1.
Figure 11:
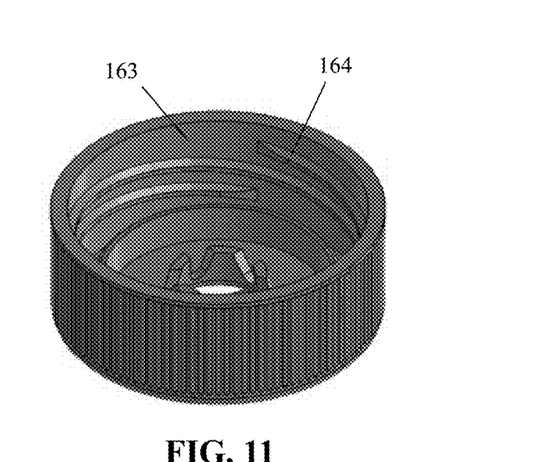
FIG. 11 is a bottom perspective view of the cap of the bottle cap assembly of FIG. 1.
Figure 12:
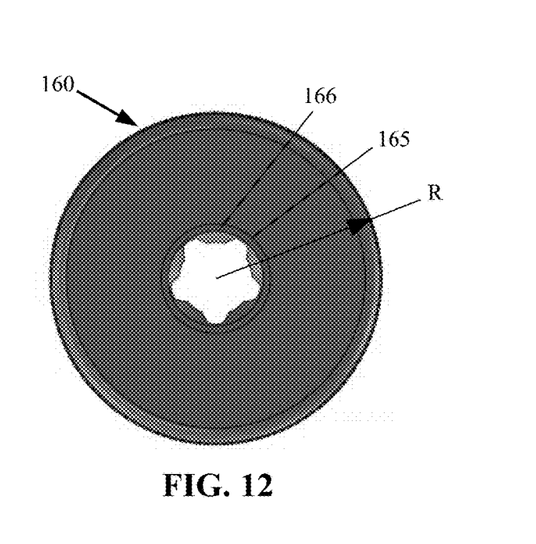
FIG. 12 is a top view of the cap shown in FIG. 10.
Figure 13:
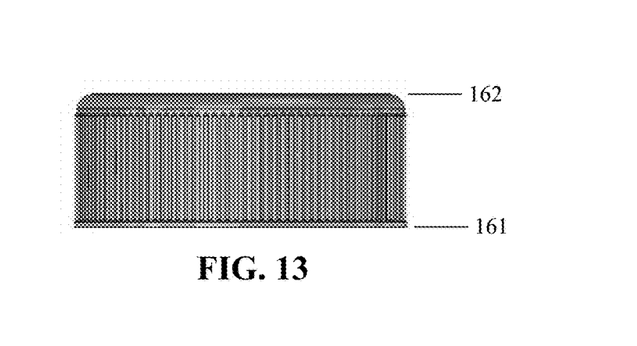
FIG. 13 is a side view of the cap shown in FIG. 10.
Figure 14:
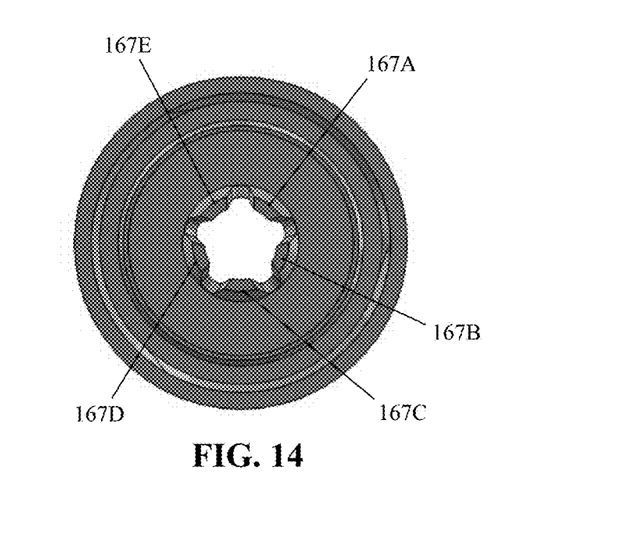
FIG. 14 is a bottom view of the cap shown in FIG. 10.

In another embodiment each of the plurality of deformable fingers (167A, 167B. 167C, 167D, 167E, etc.) may extend away from the first side 161 of the cap at an angle to the axis 160X of the cylindrical interior surface (see FIG. 11). In this embodiment the neck region 154 of the squeaker housing 150 may be conically shaped, as shown in FIG. 8.

For either embodiment, when the squeaker assembly 110 is inserted into the second opening at the second end of the cap, the conically-shaped protruding region 153 may force the fingers outwardly slightly, until the squeaker housing is inserted far enough for the protruding region 153 to be advanced past the fingers, at which time the fingers will no longer be biased by the protruding region to deform so far outwardly. Each of the plurality of fingers may then seek to return to its undeformed position, and may move inwardly into proximity with, or into contact with, the neck region 154 of the squeaker housing 150. The fingers may then be deformed only slightly, being at a second angle with respect to the axis 160X of the cylindrical interior surface, or may be completely undeformed, and in either case will be nested between the end flange 152 and the protruding region 153 of the squeaker housing 150.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A cap and squeaker device configured to mount to a water bottle to produce sounds when the water bottle is chewed on by a dog, said cap and squeaker device comprising:
    a squeaker;
    a cap comprising:
        a body with a first opening on a first side thereof defining a cylindrical interior surface of a cavity, with a plurality of internal threads formed on said cylindrical interior surface;
        a second opening on a second side of said body extending to said interior surface, being in fluid communication with said cavity;
        a plurality of deformable fingers spaced about said second opening on said second side of said body, and formed to extend from proximity to said second side of said cap towards said first side, being at a first angle with respect to an axis of said cylindrical interior surface when undeformed;
    wherein said squeaker comprises a housing, said housing comprising: an end flange, a protruding region, and a neck region between said end flange and said protruding region;
    wherein when said squeaker is inserted into said second opening at said second end of said cap, said plurality of fingers are nested between said end flange and said protruding region;
    wherein said cylindrical interior surface and said plurality of internal threads formed on said cylindrical interior surface are configured to mount said cap to a threaded water bottle; and
    wherein said second opening of said body of said cap extending to said interior surface being in fluid communication with said cavity permits fluid from the water bottle to flow through said cap and through said squeaker due to a volume decrease of the bottle by the bottle being chewed on by a dog.

2. The cap and squeaker device according to claim 1, wherein said plurality of fingers are equally spaced about said second opening on said second side of said body.

3. The cap and squeaker device according to claim 2, wherein said plurality of fingers comprises five fingers equally spaced about said second opening on said second side of said body.

4. The cap and squeaker device according to claim 3,
    wherein said first side of said body of said cap is substantially flat; and
    wherein an exterior surface of said end flange of said housing is substantially flat and is flush with said substantially flat first side of said body of said cap, when said squeaker is inserted into said second opening.

5. The cap and squeaker device according to claim 4,
    wherein said protruding region of said housing comprises a conical shape; and
    wherein said neck region of said housing comprising a conical shape.

6. The cap and squeaker device according to claim 4, wherein a side surface of said body of said cap is cylindrical.

7. A cap and squeaker device configured to mount to a water bottle to produce sounds when the water bottle is chewed on by a pet, said cap and squeaker device comprising:
    a squeaker;
    a cap comprising:
        a body with a first opening on a first side thereof defining an interior surface of a cavity, with a plurality of internal threads formed on said interior surface;
        a second opening on a second side of said body extending to said interior surface, being in fluid communication with said cavity;
        wherein said second side of said cap comprises means for engaging a portion of said squeaker;
    wherein said squeaker comprises means for engaging said means for engaging on said cap;
    wherein said interior surface and said plurality of internal threads formed on said interior surface are configured to mount said cap to a threaded water bottle; and
    wherein said second opening of said body of said cap extending to said interior surface being in fluid communication with said cavity permits fluid from the water bottle to flow through said cap and through said squeaker due to a volume decrease of the bottle by the bottle being chewed on by a pet.

8. The cap and squeaker device according to claim 7, wherein an exterior surface of said body of said cap is cylindrical.

\* \* \* \* \*